US010645622B2

(12) United States Patent
Benjebbour et al.

(10) Patent No.: US 10,645,622 B2
(45) Date of Patent: May 5, 2020

(54) RADIO BASE STATION, USER TERMINAL, CELL SELECTION METHOD AND RADIO COMMUNICATION SYSTEM

(71) Applicant: NTT DOCOMO, INC., Tokyo (JP)

(72) Inventors: Anass Benjebbour, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/828,043

(22) Filed: Nov. 30, 2017

(65) Prior Publication Data

US 2018/0092008 A1    Mar. 29, 2018

Related U.S. Application Data

(63) Continuation of application No. 14/767,124, filed as application No. PCT/JP2014/051251 on Jan. 22, 2014, now abandoned.

(30) Foreign Application Priority Data

Feb. 12, 2013 (JP) ................................ 2013-024338

(51) Int. Cl.
*H04W 36/04* (2009.01)
*H04W 16/08* (2009.01)
(Continued)

(52) U.S. Cl.
CPC ........... *H04W 36/04* (2013.01); *H04W 16/08* (2013.01); *H04W 16/32* (2013.01);
(Continued)

(58) Field of Classification Search
None
See application file for complete search history.

(56) References Cited

U.S. PATENT DOCUMENTS 6,393,279 B1    5/2002  Lee
2007/0032237 A1*  2/2007  Chang .................. H04B 17/382
                                                                      455/436
(Continued)

FOREIGN PATENT DOCUMENTS

CN      101637048 A    1/2010
CN      101816202 A    8/2010

OTHER PUBLICATIONS

Office Action issued in corresponding Chinese Patent Application No. 201480008281.3, dated Jan. 19, 2018 (29 pages).
(Continued)

*Primary Examiner* — Jamaal Henson
(74) *Attorney, Agent, or Firm* — Osha Liang LLP

(57) ABSTRACT

A user terminal selects small cells in a radio communication system in which a macro cell and small cells are arranged to overlap each other. In the cell selection method of the present invention, a macro base station to form a macro cell carries out the steps of determining the offset value to use in cell selection in a user terminal based on transmission property information of a second carrier in the small cell, and reporting the offset value to the user terminal. Also, the user terminal carries out the steps of measuring the received quality of reference signals from the macro base station and the small base station, receiving the offset value that is reported from the macro base station, and carrying out cell selection based on the received quality that is measured and the offset value that is received.

4 Claims, 16 Drawing Sheets

(51) Int. Cl.
  *H04W 16/32*   (2009.01)
  *H04W 48/20*   (2009.01)
  *H04W 36/00*   (2009.01)
  *H04W 72/08*   (2009.01)
  *H04W 84/04*   (2009.01)
  *H04W 16/28*   (2009.01)
  *H04W 88/02*   (2009.01)

(52) U.S. Cl.
  CPC ....... *H04W 36/0061* (2013.01); *H04W 48/20* (2013.01); *H04W 72/082* (2013.01); *H04W 16/28* (2013.01); *H04W 84/045* (2013.01); *H04W 88/02* (2013.01)

(56) References Cited

U.S. PATENT DOCUMENTS

| | | |
|---|---|---|
| 2008/0227453 A1 | 9/2008 | Somasundaram et al. |
| 2009/0286563 A1* | 11/2009 | Ji .......................... H04W 48/20 455/501 |
| 2010/0197300 A1* | 8/2010 | Van Der Velde ............................ H04W 36/0088 455/425 |
| 2010/0240386 A1 | 9/2010 | Hamabe et al. |
| 2011/0039557 A1* | 2/2011 | Narasimha ............ H04W 24/10 455/434 |
| 2011/0244863 A1* | 10/2011 | Matsuo ................. H04W 36/04 455/436 |
| 2011/0250891 A1* | 10/2011 | Zou ....................... H04W 36/04 455/437 |
| 2012/0188884 A1 | 7/2012 | Simonsson et al. |
| 2012/0250578 A1 | 10/2012 | Pani et al. |
| 2013/0223373 A1* | 8/2013 | Damnjanovic ..... H04W 72/082 370/329 |
| 2013/0244664 A1* | 9/2013 | Song ................. H04W 36/0083 455/437 |
| 2013/0303231 A1* | 11/2013 | Yiu .......................... H04J 3/00 455/525 |
| 2014/0045494 A1 | 2/2014 | Pekonen et al. |

OTHER PUBLICATIONS

International Search Report issued in corresponding application PCT/JP2014/051251 dated Mar. 11, 2014 (1 page).

3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (107 pages).

* cited by examiner

2GHz

4GHz

|  | 2.5GHz | 3.5GHz | 5GHz | 10GHz | 20GHz |
|---|---|---|---|---|---|
| NUMBER OF ANTENNA ELEMENTS (Tx) | 1 | 2 | 4 | 16 | 64 |
| BEAMFORMING GAIN (dB) | 0dB | 3dB | 6dB | 12dB | 18dB |

FIG.5

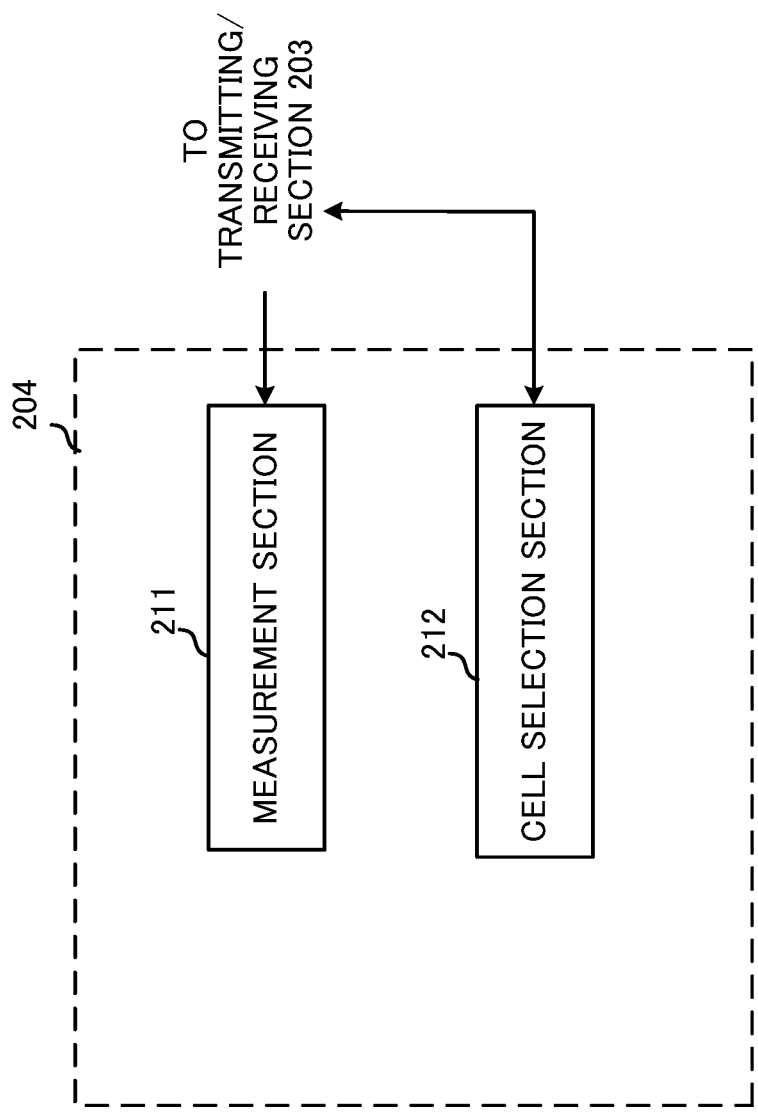

RADIO BASE STATION, USER TERMINAL, CELL SELECTION METHOD AND RADIO COMMUNICATION SYSTEM

CROSS-REFERENCE TO RELATED APPLICATIONS

The present application is a continuation application and, thereby, claims benefit under 35 U.S.C. § 120 to U.S. patent application Ser. No. 14/767,124 filed on Aug. 11, 2015, titled, "RADIO BASE STATION, USER TERMINAL, CELL SELECTION METHOD AND RADIO COMMUNICATION SYSTEM," which is a national stage application of PCT Application No. PCT/JP2014/051251, filed on Jan. 22, 2014, which claims priority to Japanese Patent Application No. 2013-024338 filed on Feb. 12, 2013. The contents of the priority applications are incorporated by reference in their entirety.

TECHNICAL FIELD

The present invention relates to a radio base station, a user terminal, a cell selection method and a radio communication system in a next-generation mobile communication system in which a macro cell and small cells are arranged to overlap each other.

BACKGROUND ART

Successor systems of long-term evolution (LTE) have been under study for the purpose of achieving further broadbandization and increased speed beyond LTE (also referred to as, for example, "LTE-advanced" or "LTE enhancement" (hereinafter referred to as "LTE-A")). In the LTE-A system, a HetNet (Heterogeneous Network) to form small cells (for example, pico cells, femto cells, and so on), which have local coverages of a radius of approximately several tens of meters, in a macro cell, which has a wide coverage of a radius of approximately several kilometers, is under study (see, for example, non-patent literature 1).

CITATION LIST

Non-Patent Literature

Non-Patent Literature 1: 3GPP TR 36.814 "E-UTRA Further Advancements for E-UTRA Physical Layer Aspects"

SUMMARY OF INVENTION

Technical Problem

In the above radio communication system, a study is also in progress to use a first carrier of a relatively low frequency band (for example, 2 GHz) in the macro cell, and use a second carrier of a relatively high frequency band (for example, 3.5 GHz) in the small cells.

When the second carrier of a high frequency band is used in the small cells, the capacity of the small cells becomes bigger than the capacity of the macro cell. Consequently, to improve the speed of transmission (throughput), it is preferable that a user terminal communicate in the small cells.

On the other hand, the path loss of the second carrier of a high frequency band increases compared to the path loss of the first carrier of a low frequency band. Consequently, when a user terminal selects cells, a problem arises that, even when it is preferable to communicate in the small cells, the user terminal may not be able to select the small cells that use the second carrier of a high frequency band.

The present invention has been made in view of the above, and it is therefore an object of the present invention to provide a radio base station, a user terminal, a cell selection method and a radio communication system that can allow a user terminal to aggressively select at least one small cell in a radio communication system in which a macro cell and at least one small cell are arranged to overlap each other.

Solution to Problem

The cell selection method according to the present invention is a cell selection method in a radio communication system in which a first cell that uses a first carrier and a second cell that use a second carrier of a higher frequency band than the first carrier are arranged to overlap each other, and this cell selection method includes the steps in which: a first radio base station forming the first cell determines an offset value to use in cell selection in a user terminal, based on transmission property information of the second carrier in the second cell, and reports the offset value to the user terminal; and the user terminal measures received quality of reference signals from the first radio base station and a second radio base station forming the second cell, receives an offset value that is reported from the first radio base station, and carries out the cell selection based on the received quality that is measured and the offset value that is received.

Advantageous Effects of Invention

According to the present invention, it is possible to allow a user terminal to aggressively select at least one small cell even in a radio communication system in which a macro cell and at least one small cell are arranged to overlap each other.

BRIEF DESCRIPTION OF DRAWINGS

FIG. 5 is a diagram to explain the relationship between frequency f and the number of antenna elements (2D)

FIG. 16 is a diagram to explain a functional structure of a user terminal according to the present embodiment.

DESCRIPTION OF EMBODIMENTS

Figure 1:
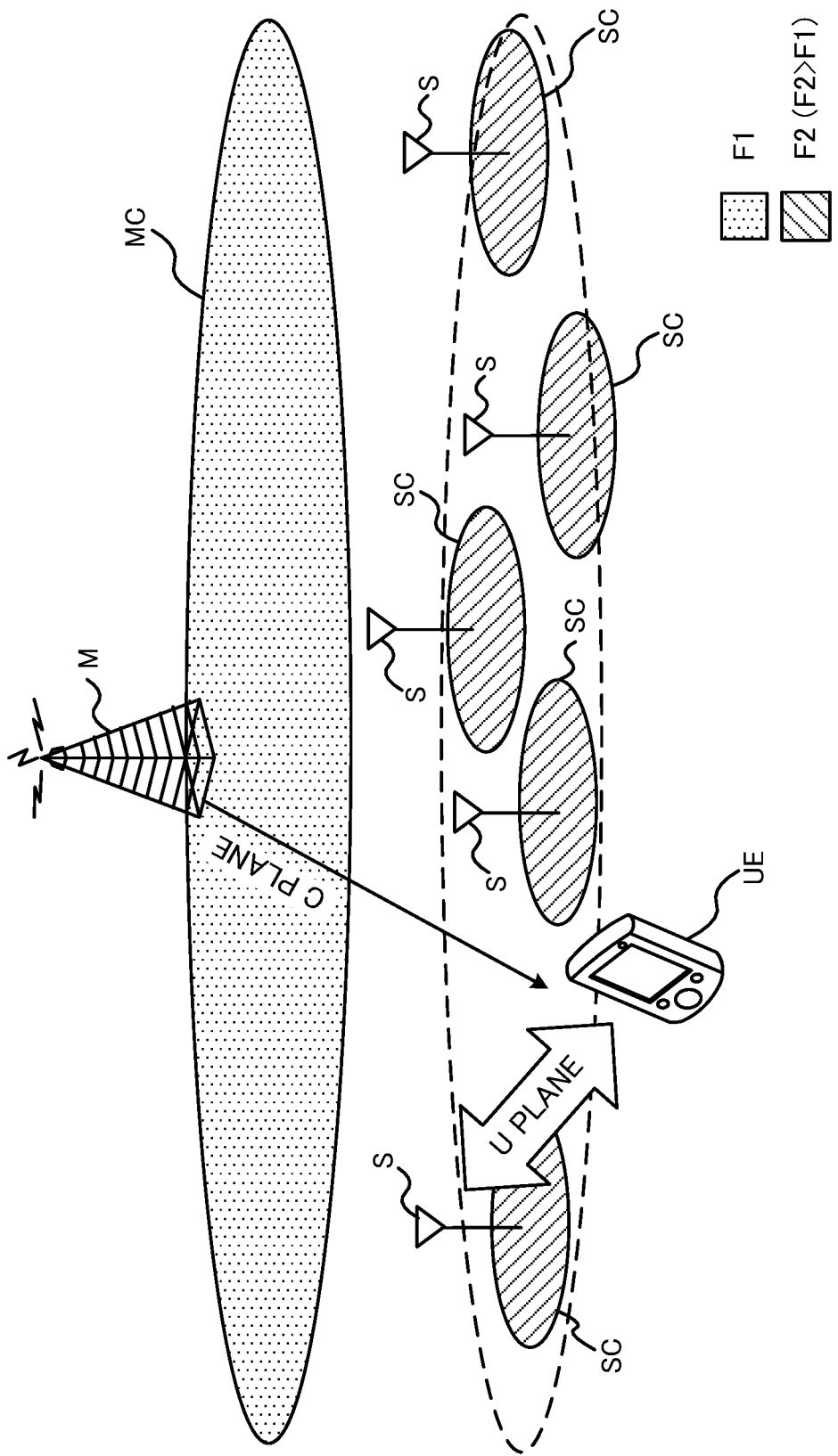
FIG. 1 is a conceptual diagram of a HetNet.

FIG. 1 is a conceptual diagram of a HetNet. As shown in FIG. 1, a HetNet refers to a radio communication system in which a macro cell MC and many small cells SC are arranged to overlap each other geographically. A HetNet includes a radio base station M that forms a macro cell MC (hereinafter referred to as "macro base station"), radio base stations S that respectively form small cells SC (hereinafter referred to as "small base stations"), and a user terminal UE that communicates with the macro base station M and at least one small base station S.

In the HetNet shown in FIG. 1, a study is in progress on a scheme ("macro-assisted" scheme) to allow the user terminal UE to primarily carry out C-plane communication with the macro base station M and carry out U-plane communication with the small base stations S. According to the "macro-assisted" scheme, control data, system information and so on are transmitted and received in the macro cell MC having a bigger coverage than the small cells SC. Meanwhile, in the small cells SC where the number of users per cell is smaller than in the macro cell MC, user data is transmitted and received. Consequently, it is possible to improve the overall system throughput.

Also, referring to the HetNet shown in FIG. 1, there is also an ongoing study to use a carrier F1 of a relatively low frequency band in the macro cell MC, and meanwhile use a carrier F2 of a relatively high frequency band in the small cells S. Now, examples of carrier F1 used in the macro cell MC and carrier F2 used in the small cells SC will be described in detail with reference to FIG. 2.

Figure 2:
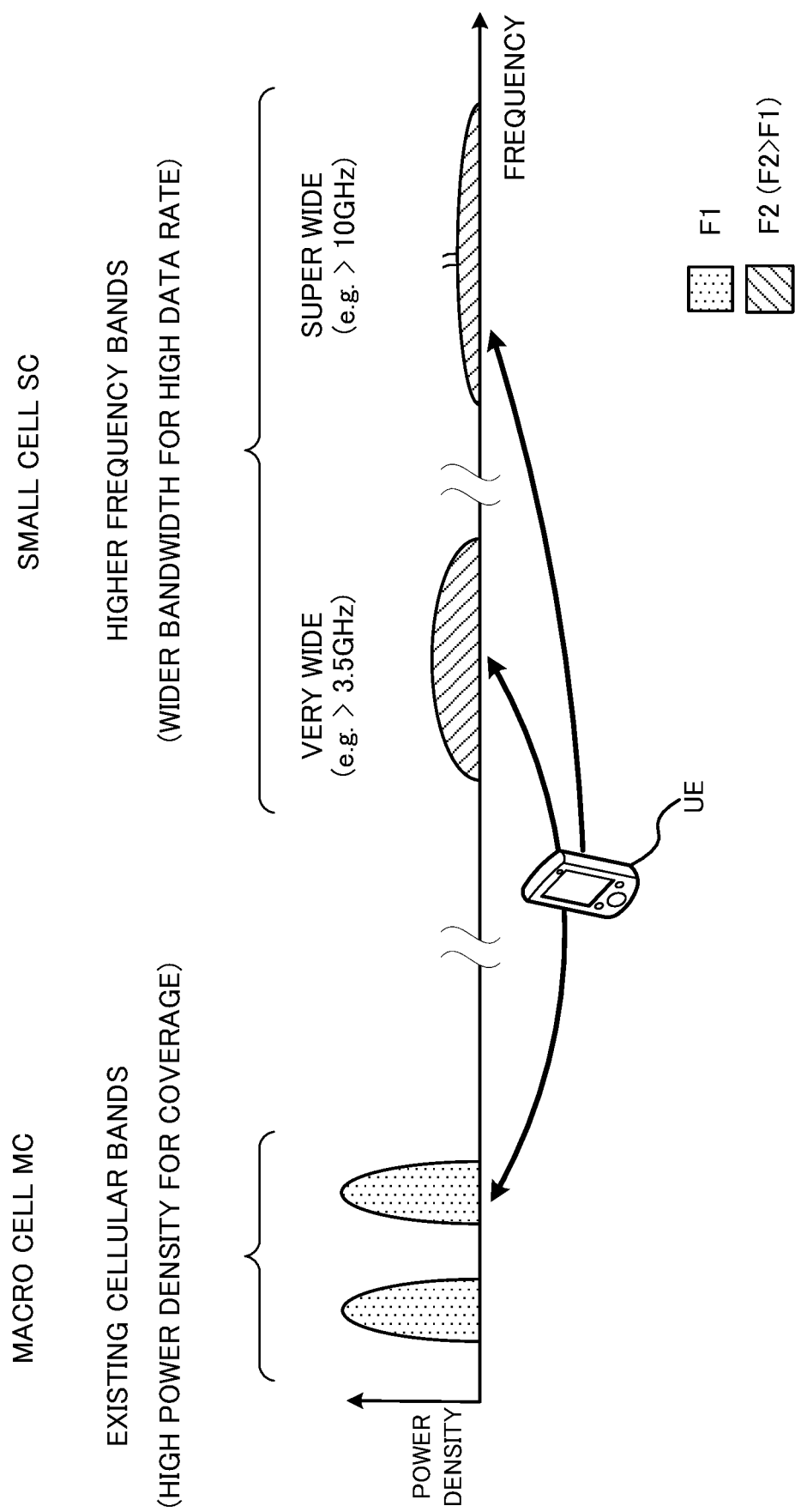
FIG. 2 is a diagram to explain examples of carriers used in a HetNet.

As shown in FIG. 2, for example, carriers of conventional frequency bands (existing cellular bands) such as 800 Hz and 2 GHz can be used as carrier F1. On the other hand, for example, carriers of higher frequency bands than conventional frequency bands such as 3.5 GHz and 10 GHz can be used as carrier F2.

Also, as shown in FIG. 2, the transmit power density of carrier F1 is higher than the transmit power density of carrier F2, so that the macro cell MC has a bigger coverage than the small cells SC. Also, the bandwidth of carrier F2 is wider than the bandwidth of carrier F1, so that the small cells SC have higher transmission speeds (capacities) than the macro cell MC.

Now, path loss increases in proportion to frequency f. To be more specific, path loss is roughly represented by 20*log 10 (f). Consequently, in the small cells SC where carrier F2 of a high frequency band such as 3.5 GHz and 10 GHz is used, a study is in progress to compensate for path loss by using three-dimensional (3D)/massive MIMO.

Figure 3:
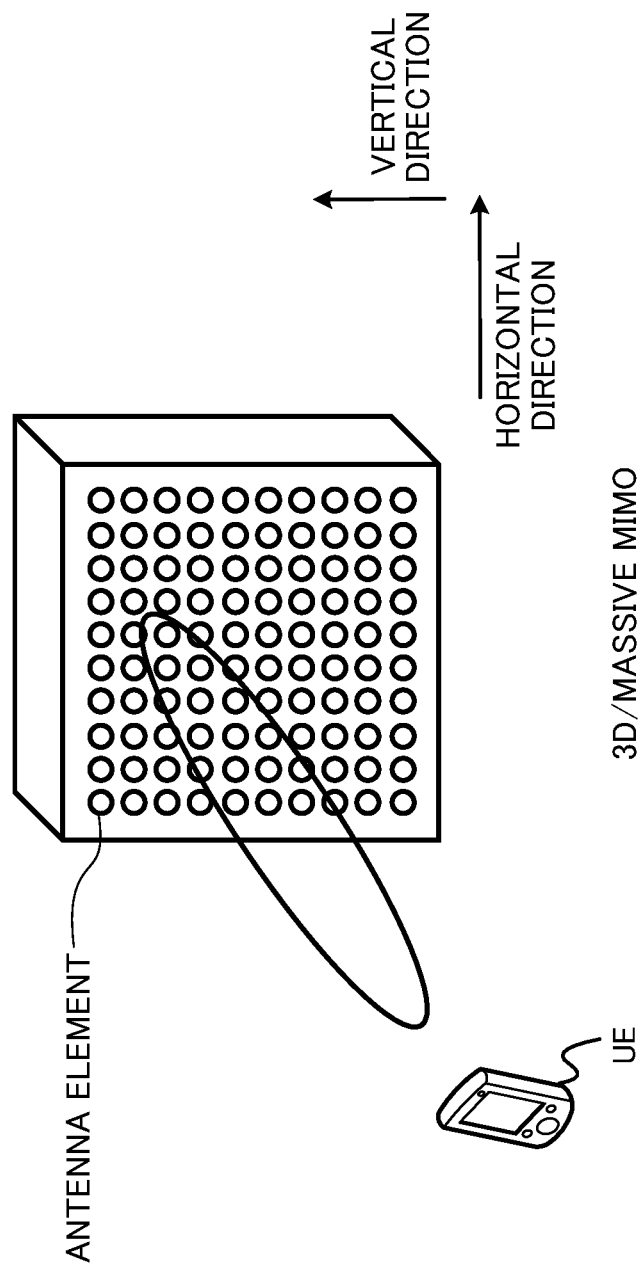
FIG. 3 is a diagram to explain 3D/massive MIMO.

FIG. 3 is a diagram to explain 3D/massive MIMO. When 3D/massive MIMO is used, a plurality of antenna elements are arranged on a two-dimensional plane. For example, as shown in FIG. 3, a plurality of antenna elements may be evenly arranged in the horizontal direction and in the vertical direction, on a two-dimensional plane. In this case, theoretically, the number of antenna elements that can be arranged on the two-dimensional plane increases in proportion to the square of frequency f.

The relationship between frequency f and the number of antenna elements will be described with reference to FIG. 4 and FIG. 5. FIG. 4 and FIG. 5 are diagrams to explain the relationship between frequency f and the number of antenna elements.

Figure 4A:
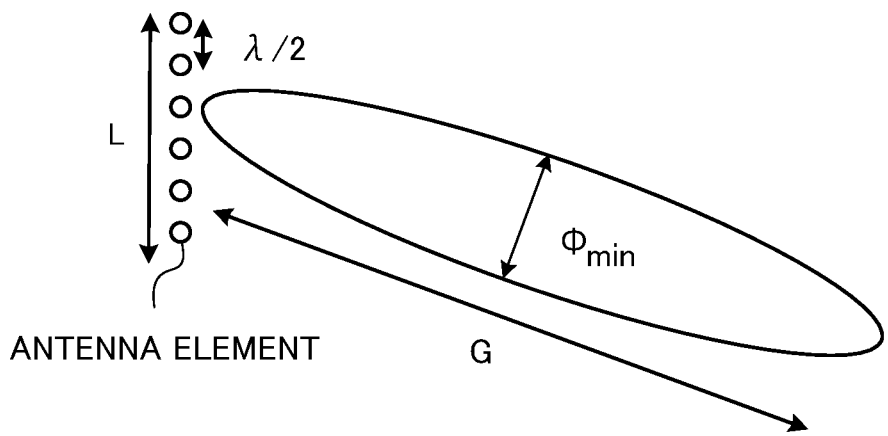
FIG. 4A provides an example of a diagram to explain the relationship between frequency f and the number of antenna elements (1D)
Figure 4B:
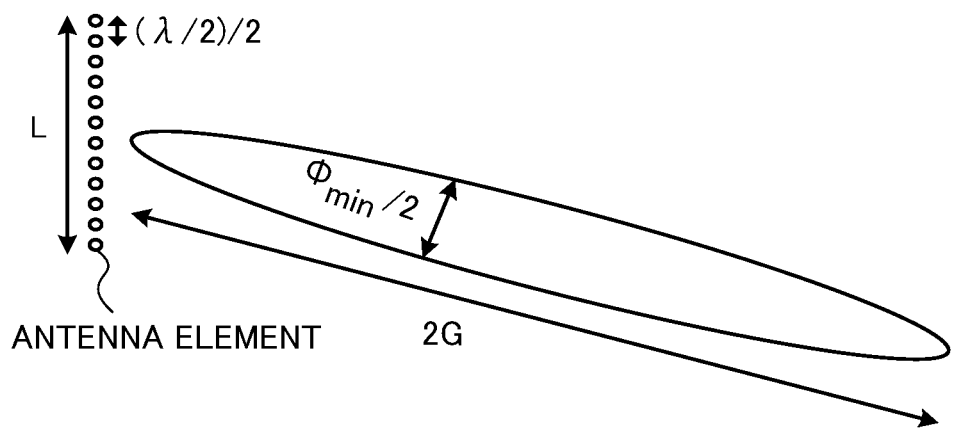
FIG. 4B provides another example of a diagram to explain the relationship between frequency f and the number of antenna elements (1D)

A case will be described here with reference to FIG. 4 where antenna elements are arranged one-dimensionally. As shown in FIG. 4A, assume that, when frequency f is 2 GHz, six antenna elements are aligned along the antenna length L. Here, as shown in FIG. 4B, if frequency f is 4 GHz (which is twice that of FIG. 4A), twelve (=6×2) antenna elements are aligned over the same antenna length L. In this way, when antenna elements are arranged one-dimensionally, the number of antenna elements that can be arranged over the antenna length L increases in proportion to frequency f.

Also, the number of antenna elements in FIG. 4B is twice the number of antenna elements in FIG. 4A. Consequently, the beamforming gain of the transmission beams formed by the twelve antenna elements shown in FIG. 4B is 2G, which is twice that of FIG. 4A. In this way, when antenna elements are arranged one-dimensionally, beamforming gain increases in proportion to the number of antenna elements.

Meanwhile, a case will be described with reference to FIG. 5 where antenna elements are arranged on a two-dimensional plane (that is, a case where 3D/massive MIMO is applied). As shown in FIG. 5, assume that one antenna element is arranged on a predetermined two-dimensional plane when frequency f is 2.5 GHz. As noted above, the number of antenna elements Tx is proportional to the square of frequency f. Consequently, in FIG. 5, assuming the proportionality constant of $1/2.5^2=0.16$, the relationship $Tx=0.16*f^2$ holds.

By this means, if frequency f is 3.5 GHz, the number of antenna elements that can be arranged on the same two-dimensional plane becomes two ($\fallingdotseq 0.16*3.5^2=1.96$). Similarly, if frequency f becomes 5 GHz, 10 GHz and 20 GHz, the number of antenna elements that can be arranged on the same two-dimensional plane becomes 4 ($=0.16*5^2$), 16 ($=0.16\times10^2$) and 64 ($=0.16*20^2$), respectively. In this way, when antenna elements are arranged two-dimensionally, the number of antenna elements that can be arranged along the antenna length L increases in proportion to the square of frequency f.

Also, in FIG. 5, too, beamforming gain increases following the increase of the number of antenna elements.

As noted earlier, when beamforming is executed by applying 3D/massive MIMO in the small cells SC where carrier F2 of a high frequency band is used, it is possible to compensate for the path loss with the beamforming gain.

Now, the user terminal UE measures the received quality of reference signals transmitted from the macro base station M and the small base station S (including the RSRQ (Reference Signal Received Quality), the RSRP (Reference Signal Received Power), and so on), and carries out cell selection based on the results of these measurements. Note that, in "cell selection," the user terminal UE selects the cell (radio base station) to communicate with.

However, even when beamforming is executed in the small cells SC by employing 3D/massive MIMO, reference signals from the small base stations S are not subject to beamforming. Consequently, the user terminal UE is unable to receive the reference signals from the small base stations S in desired received quality, and therefore is likely to be unable to select the small cells SC.

Figure 6:
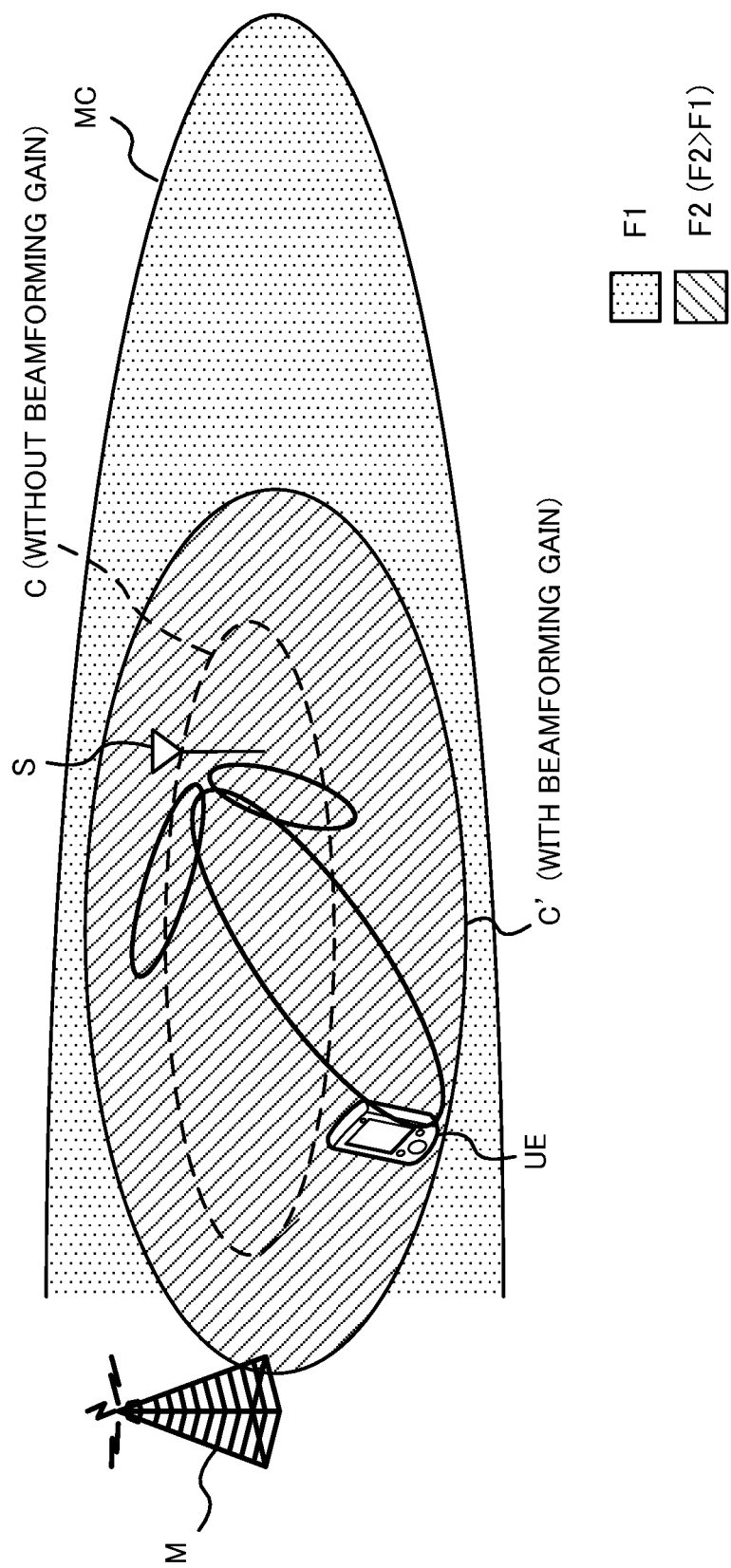
FIG. 6 is a diagram to explain beamforming employing 3D/massive MIMO.

For example, referring to FIG. 6, when beamforming is executed in a small cell SC by employing 3D/massive MIMO, the coverage C of the signal that is not subject to beamforming is smaller than the coverage C of the signal that is subject to beamforming. Consequently, even though the user terminal UE is located within the coverage C', the user terminal UE nevertheless cannot receive a reference signal that is not subject to beamforming in desired received quality. As a result of this, even in a state in which the user terminal UE can communicate with the small base station S by virtue of beamforming gain, the user terminal UE is still unable to select the small cell SC that is formed by the small base station S, and is connected with the macro cell MC.

Also, as noted earlier, in the small cell SC in which carrier F2 is used, the signal transmission bandwidth is wider than that in the macro cell MC in which carrier F1 is used (see FIG. 2). Consequently, to improve the speed of transmission (throughput), it is preferable that the user terminal UE communicate with the small cell SC.

However, in the above cell selection, the user terminal UE does not take into account the transmission bandwidth of signals that are transmitted using carrier F2. Consequently, even when communicating with the small cell SC is preferable from the perspective of transmission speed (throughput), it may happen that the user terminal selects the macro cell MC based on the received quality of reference signals, and cannot select the small cell SC.

In this way, the small cell SC to use carrier F2 is different from the macro cell MC to use carrier F1, in various transmission properties such as the beamforming gain, the transmission bandwidth, and so on. Nevertheless, since the user terminal UE selects at least one cell without taking into account the transmission properties that are shown when carrier F2 is used, it may occur that the user terminal UE is unable to select the small cell SC, and therefore is likely to fail to off-load from the macro cell MC to the small cell SC.

So, the present inventors have come up with the idea that, in a radio communication system in which a macro cell MC and at least one small cell SC are arranged to overlap each other, a user terminal UE may be allowed to aggressively select at least one small cell SC by making possible cell selection that takes into account various transmission properties in the small cells SC (for example, the number of transmitting antenna elements where the beamforming gain can be calculated, the beamforming gain, the transmission bandwidth, and so on), and thereupon arrived at the present invention.

Now, the method of cell selection according to the present invention will be described below. Note that the cell selection method according to the present invention is for use in a radio communication system in which a macro cell MC (first cell) to use a first carrier and at least one small cell SC (second cell) to use a second carrier of a higher frequency band than that of the first carrier are arranged to overlap each other. Note that the macro cell MC is formed by a macro base station M (first radio base station), and the at least one small cell SC is formed by at least one small base station S (second radio base station).

Although a case will be described below where above-described carrier F1 is used as the first carrier and above-described carrier F2 is used as the second carrier (see FIG. 2), this is by no means limiting. With the cell selection method according to the present invention, the carriers may use any frequency band as long as the second carrier has a higher frequency band than the first carrier.

(First Aspect)

Figure 7:
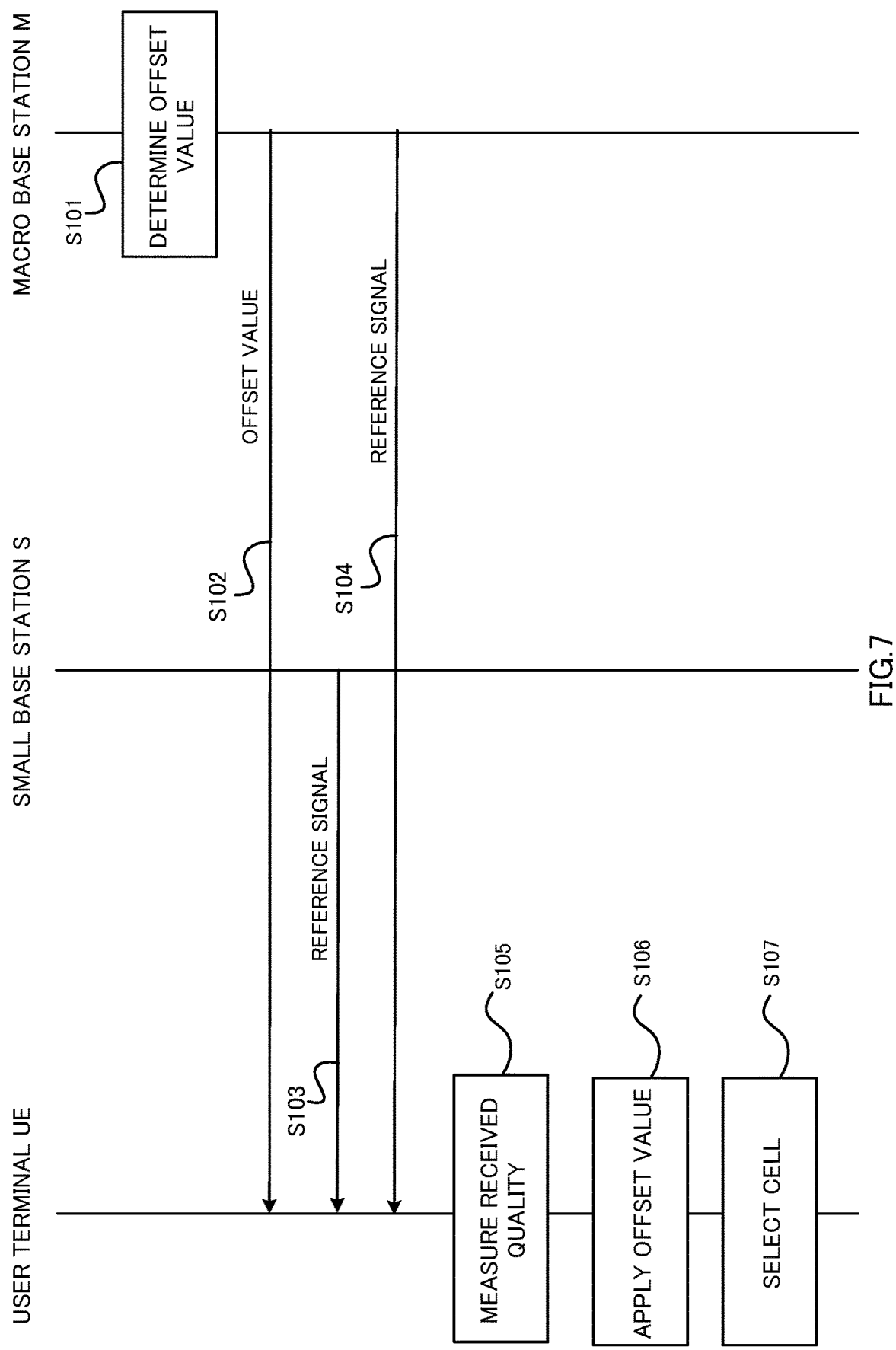
FIG. 7 is a sequence diagram to show a cell selection method according to a first aspect of the present invention.
Figure 8:
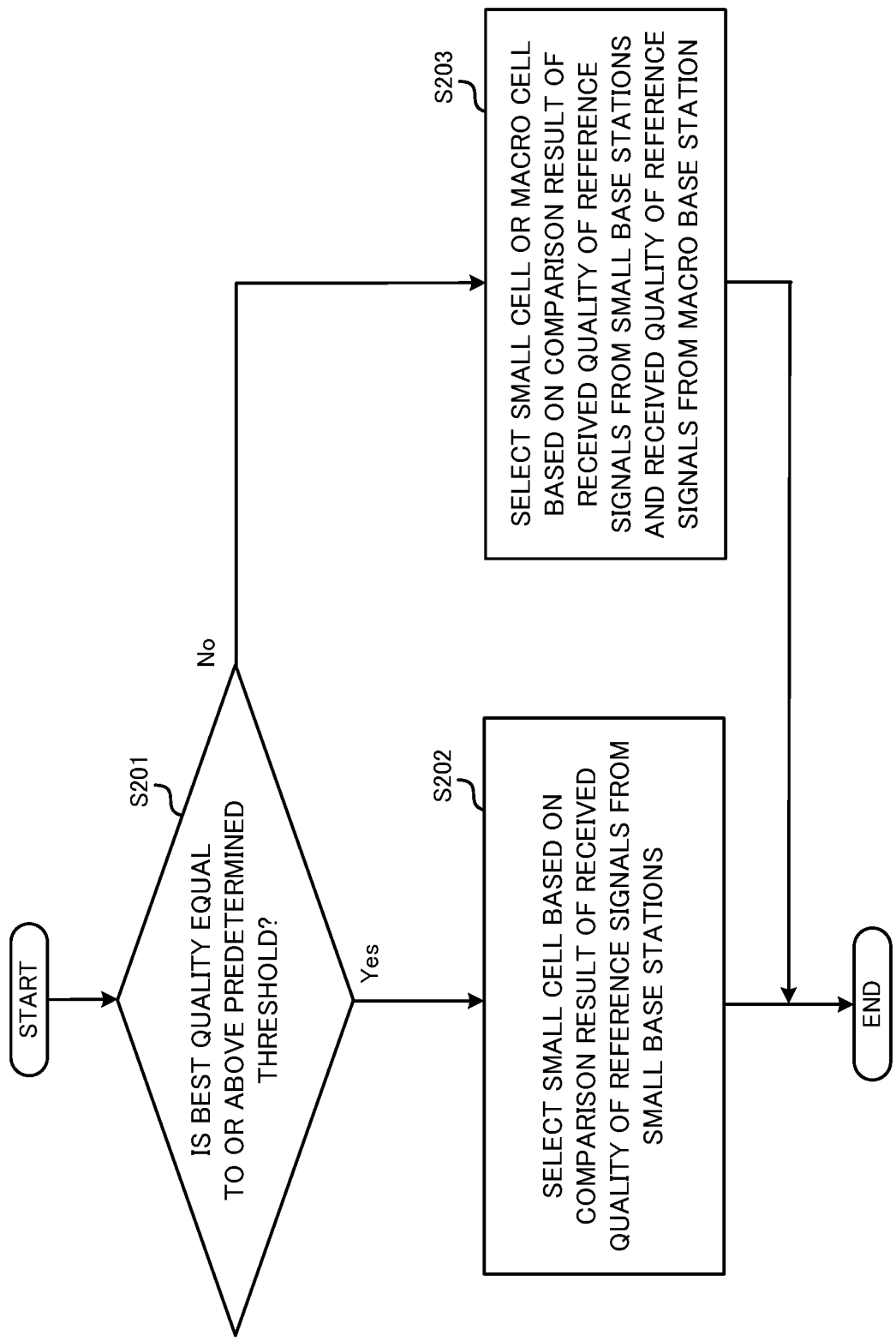
FIG. 8 is a flowchart to show a cell selection method according to a first aspect of the present invention.

With reference to FIG. 7 and FIG. 8, the cell selection method according to a first aspect of the present invention will be described. According to the first aspect, the macro base station M determines the offset value, which the user terminal UE uses upon cell selection, based on transmission property information of carrier F2 in the small cells SC, and reports the determined offset value to the user terminal UE. Also, with the first aspect, the user terminal UE measures the received quality of reference signals from the macro base station M and the small base station S, and receives the offset value reported from the macro base station M. The user terminal UE carries out cell selection based on the received quality measured, and the received offset value.

The transmission property information, which is information about transmission property when using carrier F2, includes at least one of the number of transmitting antenna elements provided in at least one small base station S, the transmission bandwidth used in the at least one small base station S, and the beamforming gain of the transmission beams used in the at least one small base station S.

FIG. 7 is a sequence diagram to show the cell selection method according to the first aspect of the present invention. As shown in FIG. 7, the macro base station M determines the offset value to be used in cell selection in the user terminal UE based on transmission property information of carrier F2 in the small cell SC (including the number of transmitting antenna elements, the transmission bandwidth and the beamforming gain, as noted earlier) (step S101). For example, the macro base station M may increase the offset value as the above transmission properties improve.

Note that the above transmission property information may be reported from the small base station S or a higher control apparatus to the macro base station M, or may be stored in advance in the macro base station M. Also, the beamforming gain may be calculated based on the number of transmitting antenna elements provided in the small base station S.

Also, the macro base station M may determine the above offset value based on the above transmission property information and interference information from neighboring cells of the small cell SC. In the small cell SC, interference from neighboring cells decreases as desired signals increase by virtue of beamforming gain. Consequently, the macro base station M may increase the offset value as interference from neighboring cells decreases.

The macro base station M reports an offset value determined as described above, to the user terminal UE (step S102). Note that the offset value may be reported by means of higher layer signaling such as RRC signaling, or may be included in broadcast information and downlink control information (DCI) for the user terminal UE.

The small base stations S and the macro base station M respectively transmit reference signals (steps S103 and S104). Here, for example, CSI-RSs (Channel State Information-Reference Signals), discovery signals and so on may be used as reference signals.

The user terminal UE measures the received quality of reference signals from the small base stations S and the macro base station M (step S105). Here, the received quality is, for example, the RSRQ (Reference Signal Received Quality), the RSRP (Reference Signal Received Power), and so on, or combinations of these may be used.

The user terminal UE applies the offset value reported from the macro base station M to the received quality of reference signals from the small base stations S (step S106). Note that the user terminal UE does not apply the offset value to the received quality of reference signals from the macro base station M. The user terminal UE carries out cell selection based on the received quality to which the offset value is applied (step S107).

The cell selection operation in step S107 of FIG. 7 will be described in detail with reference to FIG. 8. FIG. 8 is a flowchart to show the operation of cell selection in the user terminal UE. As shown in FIG. 8, the user terminal UE determines whether or not the best received quality among the received quality of reference signals from the small base stations S fulfills a predetermined threshold (step S201). Note that, as noted earlier, an offset value that is reported from the macro base station M is applied to the received quality of reference signals from the small base stations S.

If the above best received quality fulfills the predetermined threshold (step S201: Yes), the user terminal UE compares between the received quality of reference signals from the small base stations S, and selects a small cell SC (small base station S) based on the result of the comparison (step S202). For example, the user terminal UE may select the small cell SC (small base station S) showing the best received quality.

On the other hand, when the above best received quality does not fulfill the predetermined threshold (step S201: No), the user terminal UE compares the received quality of reference signals from the small base stations S and the received quality of reference signals from the macro base station M, and selects a small cell SC (small base station S) or the macro cell MC (macro base station M), based on the result of the comparison (step S203). For example, the user terminal UE may select the small cell SC (small base station S) showing the best received quality, or may select the macro cell MC (macro base station M).

As described above, with the cell selection method according to the first aspect, cell selection is carried out in the user terminal UE based on offset values that are determined based on transmission property information of carrier F2 in the small cell SC (including the number of transmitting antenna elements, the transmission bandwidth and the beamforming gain, as noted earlier), so that it is possible to allow the user terminal UE to aggressively select the small cells SC.

To be more specific, with the cell selection method according to the first aspect, an offset value that is reported from the macro base station M is applied to the received quality of reference signals from the small base station S, so that the user terminal UE can aggressively select the small cells SC based on the received quality to which the offset value is applied, and off-load from the macro cell MC to the small cells SC.

(Second Aspect)

The cell selection method according to a second aspect of the present invention will be described with reference to FIG. 9 and FIG. 10. With the second aspect, instead of carrying out cell selection in the user terminal UE based on offset value reported from the macro base station M, the transmit power of reference signals from at least one small base station S is increased based on transmission property information of carrier F2 in at least one small cell SC. Differences from the cell selection method according to the first aspect will be primarily described below.

Figure 9:
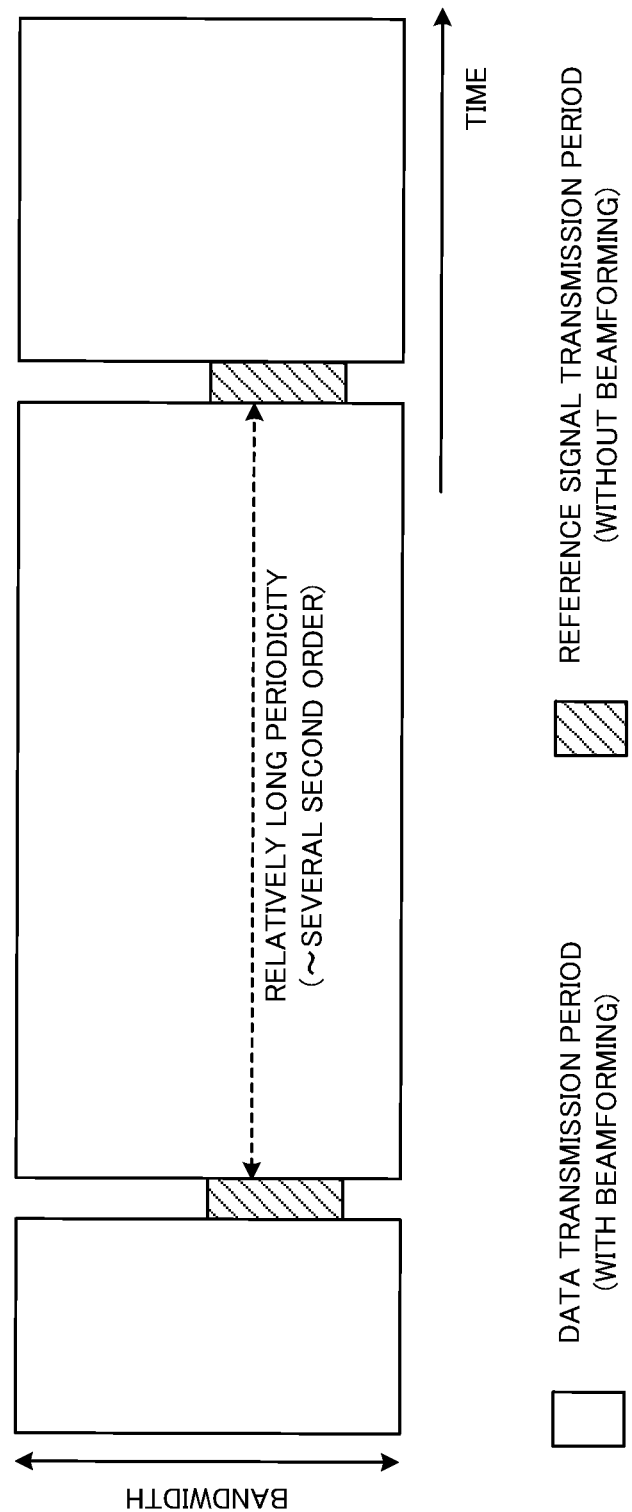
FIG. 9 is a diagram to explain a cell selection method according to a second aspect of the present invention.

FIG. 9 is a diagram to explain the reference signals transmitted from the small base station S. As shown in FIG. 9, in the small cell SC, reference signals are transmitted in a predetermined cycle. Note that the predetermined cycle may be a comparatively long cycle of, for example, several seconds, but is by no means limited to this. Also, as for the reference signals, for example, CSI-RSs, newly-defined small cell discovery signals and so on may be used, but these are by no means limiting.

In FIG. 9, in the data transmission periods, beamforming is executed. By this means, it is possible to achieve beamforming gain with respect to the data that is transmitted in the data transmission periods. Note that the data to be transmitted in the data transmission period is not limited to user data, and may include control information as well.

On the other hand, in the reference signal transmission periods, beamforming cannot be executed. This is because, in the reference signal transmission periods, feedback information such as CSI (Channel State Information) cannot be acquired, and AOA (Angle of Arrival), AOD (Angle of Departure) and so on, which are used when applying weights to a plurality of antenna elements, cannot be known. Consequently, it is not possible to achieve beamforming gain with respect to reference signals.

So, according to the second aspect, in the reference signal transmission periods, reference signals are transmitted with transmit power that is increased beyond the transmit power (transmit power density) in the data transmission periods, in accordance with the beamforming gain that is achieved in the data transmission periods.

Also, as noted earlier, in the small cell SC in which carrier F2 is used, the signal transmission bandwidth is wider than the macro cell MC in which carrier F1 is used (see FIG. 2). Consequently, according to the second aspect, in the reference signal transmission periods, reference signals may be transmitted with transmit power that is increased in accordance with the amount of increase of the transmission bandwidth of carrier F2 compared to carrier F1. Note that the amount of reference signal amplification in the small cells SC may be reported from the macro cell MC to the small cells SC.

In this way, according to the second aspect, the small base stations S determine the transmit power of reference signals based on transmission property information using carrier F2 is used (including, for example, the beamforming gain, the transmission bandwidth and the number of transmitting antenna elements, as noted earlier), and transmit the reference signals with the determined transmit power. By this means, the user terminal UE can receive the reference signals in desired received quality, so that it is possible to allow the user terminal UE to aggressively select the small cell SC, without applying offset values to the received quality of reference signals from the small base station S.

Figure 10:
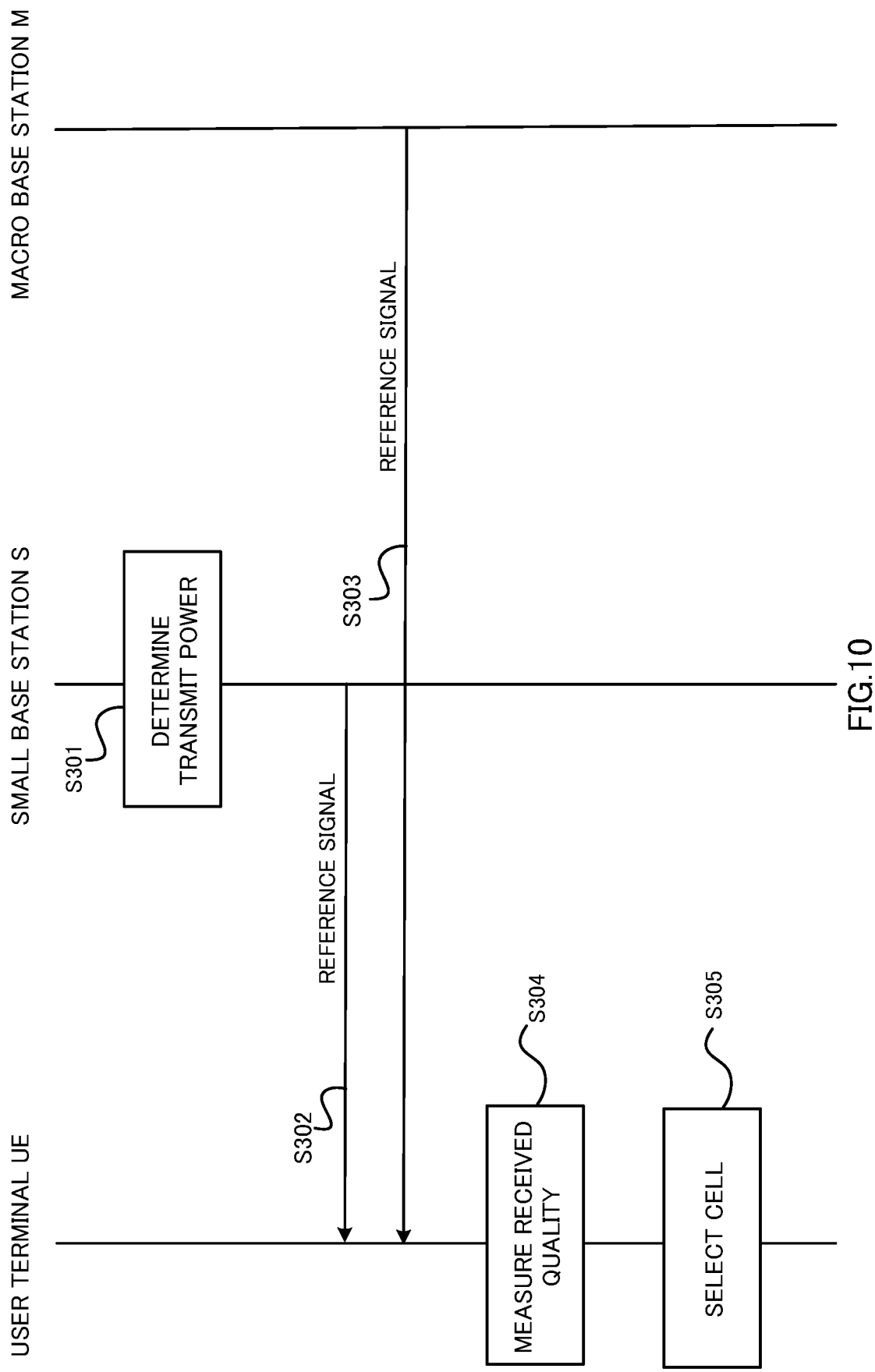
FIG. 10 is a sequence diagram to show a cell selection method according to a second aspect of the present invention.

FIG. 10 is a sequence diagram to show the cell selection method according to the second aspect of the present invention. As shown in FIG. 10, the small base stations S determine the transmit power of reference signals based on transmission property information of carrier F2 (including the beamforming gain, the transmission bandwidth and the number of transmitting antenna elements, as noted earlier) (step S301).

For example, the small base station S may increase the transmit power of reference signals in proportion to at least one of the beamforming gain and the transmission bandwidth of the transmission beams used in data transmission periods (see FIG. 9). Note that the beamforming gain may be calculated based on the number of transmitting antenna elements provided in the small base stations S.

Also, the small base stations S may determine the transmit power of reference signals based on the above-noted transmission property information and interference information from neighboring cells of the small cells SC. In the small cells SC, interference from neighboring cells decreases as desired signals increase by virtue of beamforming gain. Consequently, taking into account the decrease of interference from neighboring cells, the transmit power of reference signals may be lowered as well.

The small base stations S transmit reference signals with transmit power that is determined as described above (step S302). Meanwhile, the macro base station M also transmits reference signals (step S303).

The user terminal UE measures the received quality of reference signals from the small base stations S and the macro base station M (step S304). The received quality here may be, for example, the RSRQ, the RSRP and so on, or combinations of these may be used.

The user terminal UE carries out cell selection based on the received quality measured in step S304 (step S305). To be more specific, the user terminal UE carries out cell selection without using the offset value that has been described with the first aspect. Also, in step S305, cell selection may be carried out using the same judgment as in FIG. 8. When the judgment of FIG. 8 is used, unlike the first aspect, no offset value is applied to the received quality of reference signals from the small base station S.

As described above, with the cell selection method according to the second aspect, reference signals that are used in cell selection in the user terminal UE are transmitted with transmit power that is determined based on transmission property information of carrier F2. By this means, the user terminal UE can receive the reference signals in desired received quality, so that it is possible to allow the user terminal UE to aggressively select the small cells SC, without applying offset values to the received quality of reference signals from the small base station S. As a result of this, the user terminal UE can off-load from the macro cell MC to the small cells SC.

Note that although, in FIG. 10, the transmit power of reference signals from the small base station S is determined in the small base station S, this is by no means limiting. The macro base station M may determine the transmit power of reference signals from the small base station S based on transmission property information of carrier F2 in the small cell SC. In this case, the macro base station M may report the determined transmit power to the small base station S, and the small base station S may transmit reference signals with the reported transmit power.

As described above, the cell selection method according to the second aspect is a cell selection method in a radio communication system where a macro cell MC (first cell), in which carrier F1 (first carrier) is used, and at least one small cell SC (second cell), in which carrier F2 (second carrier) of a higher frequency band than carrier F1 is used, are arranged to overlap each other, and includes a step in which the at least one small base station S (second radio base station) that form the small cell SC transmit reference signals with transmit power that is determined based transmission property information of carrier F2 in the small cell SC, a step in which a user terminal UE measures the received quality of reference signals from the at least one small base station S and the macro base station M forming the macro cell MC (first radio base station), and a step in which the user terminal UE carries out cell selection based on the received quality measured.

(Structure of Radio Communication System)

Now, the structure of the radio communication system according to the present embodiment will be described. In this radio communication system, the above-described cell selection methods (including the first aspect and the second aspect) are employed. A schematic structure of the radio communication system according to the present embodiment will be described below with reference to FIG. 11 to FIG. 16.

Figure 11:
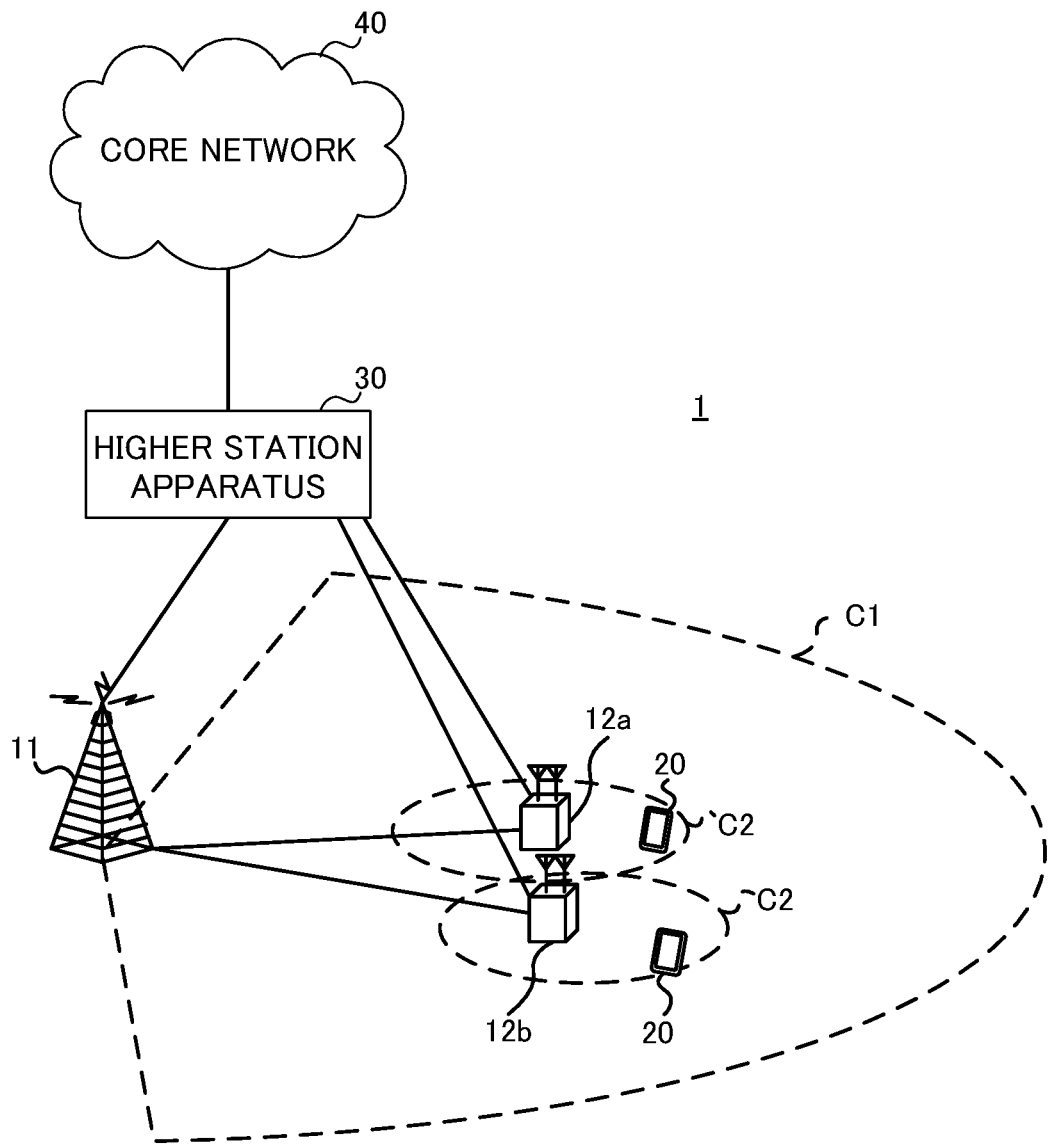
FIG. 11 is a schematic diagram to show an example of a radio communication system according to the present embodiment.

FIG. 11 is a diagram to show a schematic structure of the radio communication system according to the present embodiment. Note that the radio communication system shown in FIG. 11 is a system to accommodate, for example, an LTE system, an LTE-A system, IMT-advanced, 4G, FRA (Future Radio Access) and so on.

As shown in FIG. 11, a radio communication system 1 includes a macro base station 11 that forms a macro cell C1, and small base stations 12a and 12b that form small cells C2, which are placed inside the macro cell C1 and which are narrower than the macro cell C1. Also, in the macro cell C1 and in each small cell C2, user terminals 20 are placed. The user terminals 20 are configured to be able to perform radio communication with both the macro base station 11 and the small base stations 12.

In the macro cell C1, for example, carrier F1 of a relatively low frequency band such as 800 MHz and 2 GHz is used, while, in the small cells C2, for example, carrier F2 of a relatively high frequency band such as 3.5 GHz and 10 GHz is used. Note that carrier F1 may be referred to as a "conventional carrier," a "legacy carrier," a "coverage carrier" and so on. Also, carrier F2 may be referred to as an "additional carrier," a "capacity carrier" and so on.

The macro base station 11 and each small base station 12 may be connected by wire or may be connected by wireless. The macro base station 11 and the small base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these.

Note that the macro base station 11 is a radio base station having a relatively wide coverage, and may be referred to as an "eNodeB," a "radio base station apparatus," a "transmission point" and so on. The small base stations 12 are radio base stations to have local coverages, and may be referred to as "RRHs (Remote Radio Heads)," "pico base stations," "femto base stations," "Home eNodeBs," "transmission points," "eNodeBs" and so on.

Furthermore, the small cells C2 that are formed by the small base stations 12 may be a type of cells in which the PDCCH is arranged in maximum three OFDM symbols at the top of a subframe, or may be a type of cells (new carrier type, additional carrier type) in which this PDCCH is not arranged.

The macro base station 11 and the small base stations 12 will be collectively referred to as "radio base station 10," unless distinction needs to be drawn otherwise. The user terminals 20 are terminals to support various communication schemes such as LTE, LTE-A and so on, and may include both mobile communication terminals and fixed communication terminals.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing the system band into bands formed with one or continuous resource blocks, per terminal, and allowing a plurality of terminals to use mutually different bands.

Now, communication channels used in the radio communication system shown in FIG. 11 will be described. Downlink communication channels include a PDSCH (downlink shared data channel), which is used by each user terminal 20 on a shared basis, and downlink L1/L2 control channels (a PDCCH, a PCFICH, a PHICH and an EPDCCH). User data and higher control information are transmitted by the PDSCH. Scheduling information for the PDSCH and the PUSCH and so on are transmitted by the PDCCH. The number of OFDM symbols to use for the PDCCH is transmitted by the PCFICH (Physical Control Format Indicator CHannel). HARQ ACKs and NACKs for the PUSCH are transmitted by the PHICH (Physical Hybrid-ARQ Indicator CHannel). Also, the scheduling information for the PDSCH and the PUSCH and so on may be transmitted by the EPDCCH as well. This EPDCCH (enhanced downlink control channel) is frequency-division-multiplexed with the PDSCH.

Uplink communication channels include the PUSCH (uplink shared data channel), which is used by each user terminal 20 on a shared basis, and a PUCCH (Physical Uplink Control CHannel), which is an uplink control channel. User data and higher control information are transmitted by this PUSCH. Also, by means of the PUCCH, downlink radio quality information (CQI: Channel Quality Indicator), ACKs, NACKs and so on are transmitted.

Figure 12:
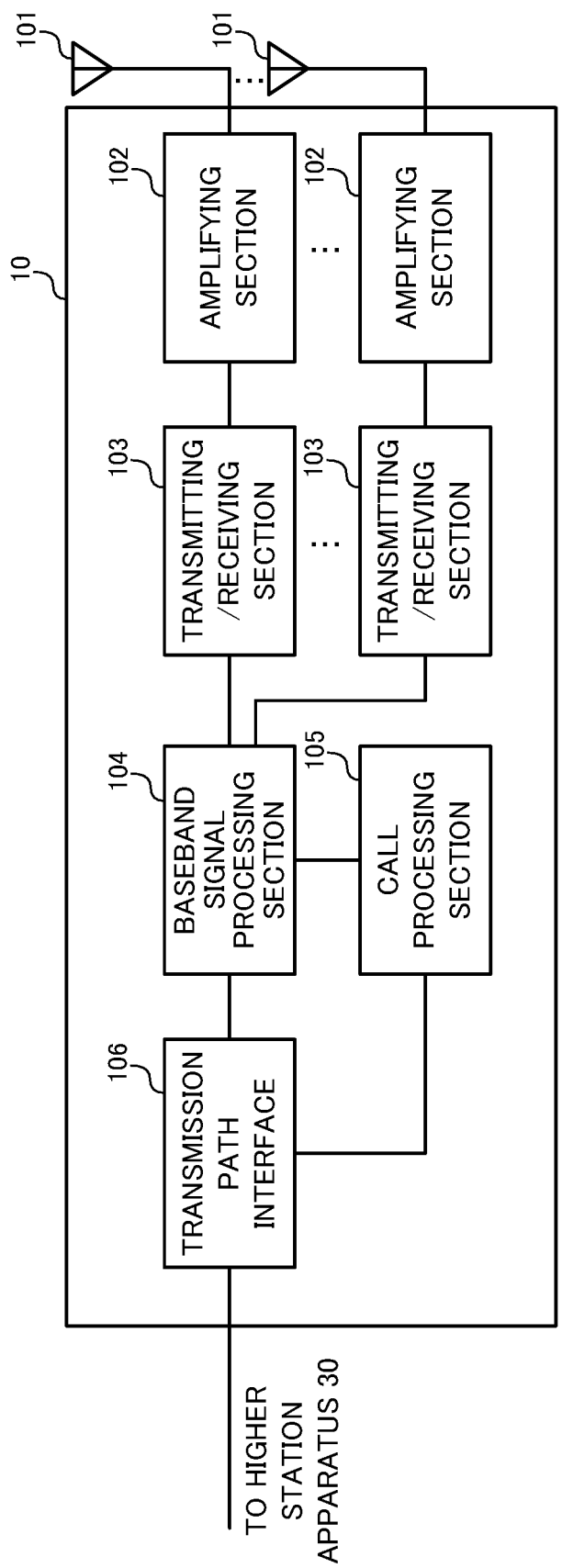
FIG. 12 is a diagram to explain an overall structure of a radio base station according to the present embodiment.

FIG. 12 is a diagram to show an overall structure of a radio base station 10 (which may be either a macro base station 11 or a small base station 12) according to the present embodiment. The radio base station 10 has a plurality of transmitting/receiving antennas 101 for MIMO transmission, amplifying sections 102, transmitting/receiving sections 103, a baseband signal processing section 104, a call processing section 105 and a transmission path interface 106.

User data to be transmitted from the radio base station 10 to a user terminal 20 on the downlink is input from the higher station apparatus 30, into the baseband signal processing section 104, via the transmission path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is transferred to each transmitting/receiving section 103. Furthermore, downlink control signals are also subjected to transmission processes such as channel coding and an inverse fast Fourier transform, and transferred to each transmitting/receiving section 103.

Each transmitting/receiving section 103 converts the downlink signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, as for uplink signals, radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data that is included in the input uplink signals is subjected to an FFT process, an IDFT process, error correction decoding, a MAC retransmission control receiving process, and RLC layer and PDCP layer receiving processes, and transferred to the higher station apparatus 30 via the transmission path interface 106. The call processing section 105 performs call processing such as setting up and releasing communication channels, manages the state of the radio base station 10 and manages the radio resources.

Figure 13:
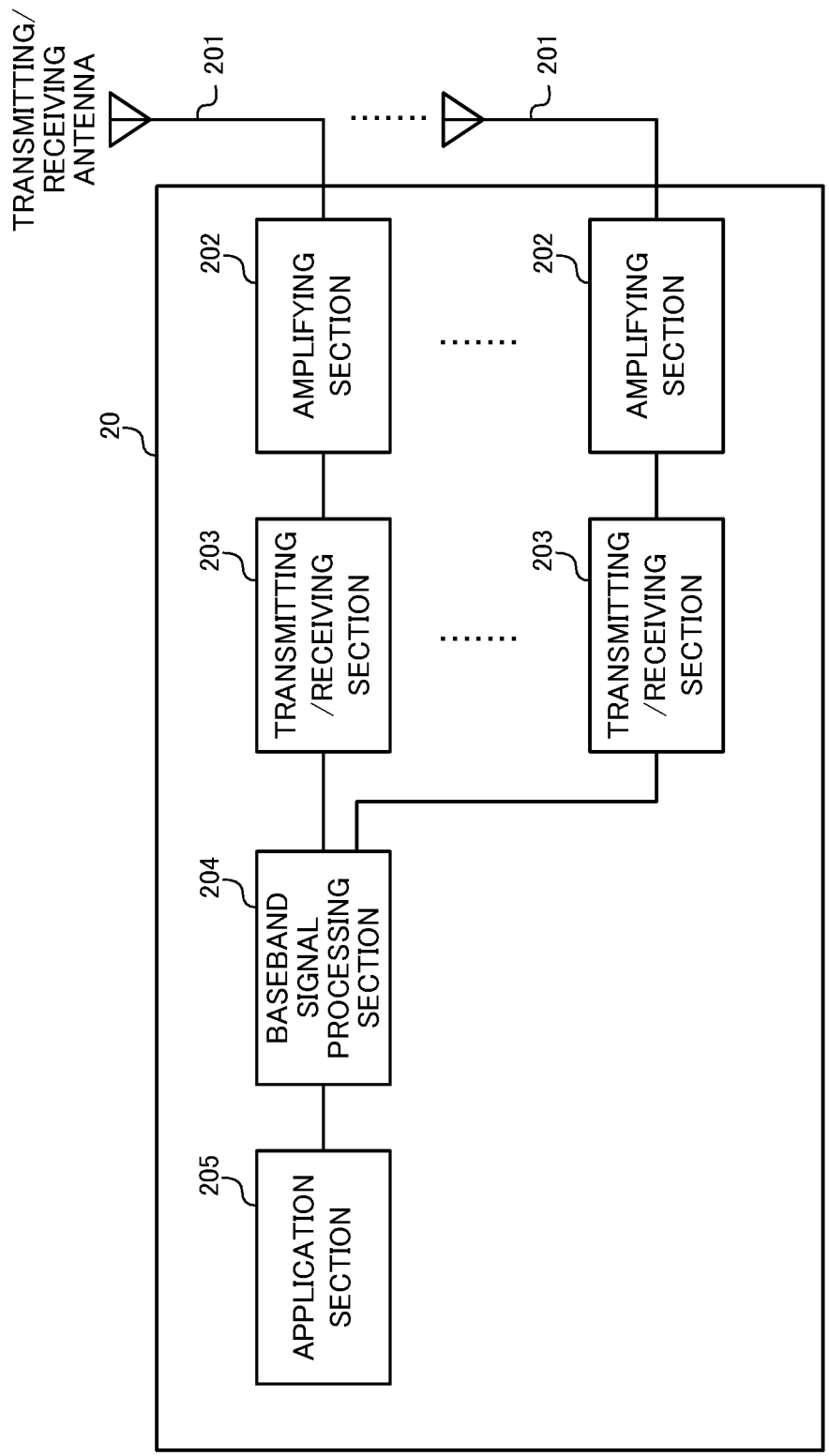
FIG. 13 is a diagram to explain an overall structure of a user terminal according to the present embodiment.

FIG. 13 is a diagram to show an overall structure of a user terminal 20 according to the present embodiment. The user terminal 20 has a plurality of transmitting/receiving antennas 201 for MIMO transmission, amplifying sections 202, transmitting/receiving sections 203, a baseband signal processing section 204 and an application section 205.

As for downlink signals, radio frequency signals that are received in a plurality of transmitting/receiving antennas 201 are each amplified in the amplifying sections 202, subjected to frequency conversion in the transmitting/receiving sections 203, and input in the baseband signal processing section 204. In the baseband signal processing section 204, an FFT process, error correction decoding, a retransmission control receiving process and so on are performed. The user data that in included in the downlink signals is transferred to the application section 205. The application section 205 performs processes related to higher layers above the physical layer and the MAC layer. The broadcast information in the downlink data is also transferred to the application section 205.

Meanwhile, uplink user data is input from the application section 205 to the baseband signal processing section 204. In the baseband signal processing section 204, a retransmission control (H-ARQ (Hybrid ARQ)) transmission process, channel coding, precoding, a DFT process, an IFFT process and so on are performed, and the result is transferred to each transmitting/receiving section 203. Baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 203.

Figure 14:
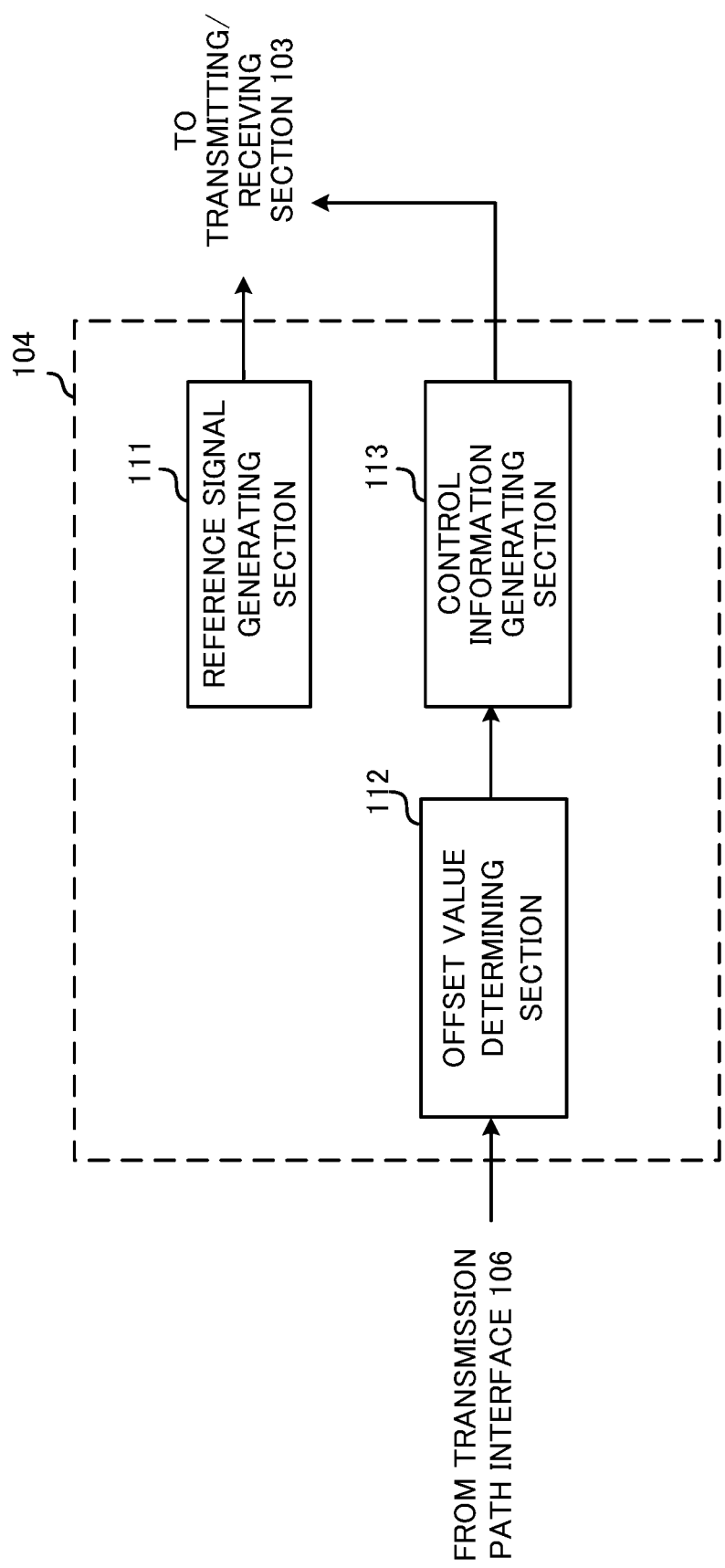
FIG. 14 is a diagram to explain a functional structure of a macro base station according to the present embodiment.

Next, functional structures of the macro base station 11, the small base stations 12 and the user terminal 20 will be described in detail with reference to FIG. 14 to FIG. 16. FIG. 14 is functional structure diagram of the macro base station 11 according to the present embodiment. Note that the following functional structure is formed with the baseband signal processing section 104 and so on provided in the macro base station 11. As shown in FIG. 14, the macro base station 11 has a reference signal generating section 111, an offset value determining section 112 and a control information generating section 113.

Note that the offset value determining section 112 constitutes the determining section of the present invention (the first aspect). The offset value determining section 112 may be removed in the second aspect of the present invention. Also, the control information generating section 113 and the transmitting/receiving sections 103 constitute the reporting section of the present invention (the first aspect).

The reference signal generating section 111 generates reference signals and transmits these signals to the transmitting/receiving sections 103. The reference signals may include, for example, the CRS (Cell-specific Reference Signal), the CSI-RS (Channel State Information-Reference Signal), the DM-RS (DeModulation-Reference Signal), and so on. The reference signals that are output to the transmitting/receiving sections 103 are transmitted by using carrier F1.

The offset value determining section 112 determines the offset value to be used in cell selection in the user terminal 20 and outputs this offset value to the control information generating section 113. To be more specific, the offset value determining section 112 determines the above offset value based on transmission property information of carrier F2 in the small cells C2. For example, the offset value determining section 112 may increase the offset value as the transmission properties of carrier F2 improve.

Note that the transmission property information of carrier F2 includes at least one of the number of transmitting antenna elements provided in the small base stations 12, the transmission bandwidth used in the small base stations 12, and the beamforming gain of the transmission beams used in the small base stations 12. Note that the number of transmitting antenna elements may be the number of transmitting antenna elements in the transmitting/receiving antennas 101 of the small base stations 12. Also, the beamforming gain may be calculated based on the number of transmitting antenna elements.

Also, the offset value determining section 112 may determine the above offset value based on the transmission property information of carrier F2, and interference information from neighboring cells of small cell C2. For example, the offset value determining section 112 may increase the offset value in accordance with the decrease of interference from neighboring cells.

The control information generating section 113 generates control information and outputs this to the transmitting/receiving section 103. To be more specific, the control information generating section 113 generates control information that includes the offset value input from the offset value determining section 112. The control information to include the offset values may be transmitted to the user terminal 20 through higher layer signaling. Note that the control information to include the offset value may be transmitted to the user terminal 20 via a broadcast channel (BCH), and downlink control channels (the PDCCH and the EPDCCH) and so on.

Figure 15:
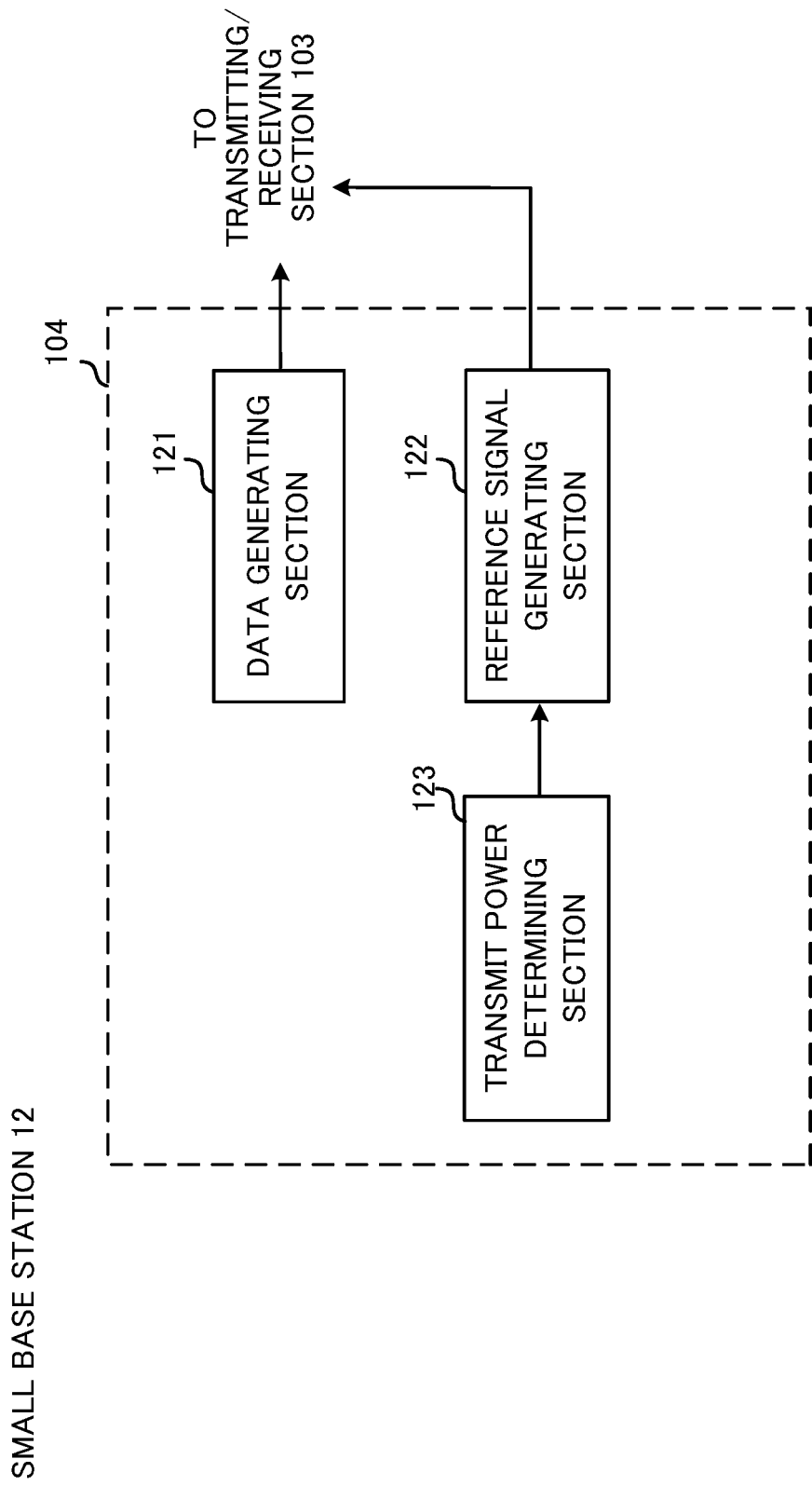
FIG. 15 is a diagram to explain a functional structure of a small base station according to the present embodiment.

FIG. 15 is a functional structure diagram of a small base station 12 according to the present embodiment. Note that the following functional structure is formed with the baseband signal processing section 104 and so on provided in the small base station 12. As shown in FIG. 15, the small base station 12 has a data generating section 121, a reference signal generating section 122 and a transmit power determining section 123.

Note that the transmit power determining section 123 may be removed in the first aspect of the present invention. With the second aspect of the present invention, the transmit power determining section 123 constitutes a determining section that determines the transmit power of reference signals based on transmission property information of carrier F2 in the small cell SC.

The data generating section 121 generates data to be transmitted in the transmission beam directed to the user terminal 20, and outputs this data to the transmitting/receiving sections 103. This data may include not only user data, but may also include control information as well. The data that is output to the transmitting/receiving sections 103 is transmitted by using carrier F2 in the data transmission periods (FIG. 9).

Also, the data generating section 121 generates beamforming information based on feedback information from the user terminal 20 (for example, CSI), and outputs this beamforming information to the transmitting/receiving sections 103. This beamforming information includes, for example, the AOA (Angle of Arrival) and the AOD (Angle of Departure), which are used to apply weights to the transmitting antenna elements. In the data transmission periods (FIG. 9), transmission beams that are formed based on this beamforming information are used.

The reference signal generating section 122 generates reference signals and outputs these signals to the transmitting/receiving sections 103. The reference signals include, for example, the CSI-RS, the DM-RS, the discovery signal and so on. The reference signals that are output to the transmitting/receiving sections 103 are transmitted by using carrier F2 in the reference signal transmission periods (FIG. 9).

The transmit power determining section 123 determines the transmit power of the reference signals based on transmission property information of carrier F2 in the small cell C2. Also, the transmit power determining section 123 outputs transmit power information to indicate the determined transmit power to the reference signal generating section 122, so that the reference signals are transmitted with the determined transmit power. For example, the transmit power determining section 123 may increase the transmit power of reference signals as the transmission properties of carrier F2 improve.

Note that the transmission property information, which is information about transmission property when using carrier F2, includes at least one of the number of transmitting antenna elements provided in the small base stations 12, the transmission bandwidth used in the small base stations 12, and the beamforming gain of the transmission beams used in the small base stations 12. Also, the beamforming gain may be calculated based on the number of transmitting antenna elements, beamforming information (for example, AOA, AOD and so on) generated in the data generating section 121, and so on.

FIG. 16 is a functional structure diagram of a user terminal 20 according to the present embodiment. Note that the following functional structure may be formed with the baseband signal processing section 204 and so on provided in the user terminal 20. As shown in FIG. 16, the user terminal 20 has a measurement section 211 and a cell selection section 212.

The measurement section 211 measures the received quality of reference signals from the macro base station 11 and the small base stations 12. As noted earlier, the received quality here may be the RSRQ, the RSRP and so on, or combinations of these may be used.

The cell selection section 212 carries out cell selection based on the received quality measured in the measurement section 211. With the first aspect of the present invention, the cell selection section 212 receives the offset value reported from the macro base station 11 via the transmitting/receiving section 203 and so on. The cell selection section 212 carries out cell selection based on the offset value reported from the macro base station 11 and the received quality measured in the measurement section 211.

To be more specific, in the first aspect of the present invention, the cell selection section 212 applies the above offset value to the received quality of reference signals from the small base stations 12. The cell selection section 212 carries out cell selection based on the received quality to which the offset value is applied. Note that the details of the cell selection have been described earlier with reference to FIG. 8, and therefore will not be described again.

Meanwhile, according to the second aspect of the present invention, the cell selection section 212 carries out cell selection without using the above offset value. As noted earlier, in the second aspect, reference signals are transmitted with transmit power that is increased in proportion to the transmission property of carrier F2 (for example, the beamforming gain, the transmission bandwidth, etc.). By this means, the user terminal UE can receives the reference signals in desired received quality, so that it is possible to allow the user terminal UE to aggressively select the small cells C2, without applying offset values to the received quality of reference signals from the small base stations 12.

As described above, with the radio communication system 1 according to the present embodiment, when the user terminal 20 carries out cell selection, an offset value, which is determined based on transmission property information of carrier F2 in the small cell C2 (including the number of transmitting antenna elements, the transmission bandwidth and the beamforming gain, as noted earlier), is applied to the received quality of reference signals from the small base stations 12. Consequently, the user terminal 20 can aggressively select the small cells C2 based on the received quality to which the offset value is applied, and off-load from the macro cell C1 to the small cells C2.

Furthermore, with the radio communication system 1 according to the present embodiment, reference signals to be used in cell selection in the user terminal 20 are transmitted with transmit power that is determined based on transmission property information of carrier F2. By this means, the user terminal 20 can receive the reference signals in desired received quality, so that it is possible to allow the user terminal 20 to aggressively select the small cells C2, without applying offset values to the received quality of reference signals from the small base stations 12. As a result of this, the user terminal 20 can off-load from the macro cell C1 to the small cells C2.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The invention claimed is:

1. A user terminal that is used in a radio communication system having a first cell, in which a first carrier is used at a first frequency, and a second cell, in which a second carrier is used at a second frequency, the user terminal comprising:
   a receiving section that receives a signal from the second cell; and
   a processor that measures the signal and determines a measurement result of the signal by taking into account an offset that corresponds to information regarding a number of antenna elements in the second cell.

2. The user terminal according to claim 1, wherein the offset is provided from the first cell.

3. The user terminal according to claim 1, wherein the processor determines the measurement result to which the offset is applied, by using a threshold.

4. The user terminal according to claim 2, wherein the processor determines the measurement result to which the offset is applied, by using a threshold.

* * * * *